INVENTOR.
Lee S. Wright
BY Paul Fitzpatrick
ATTORNEY

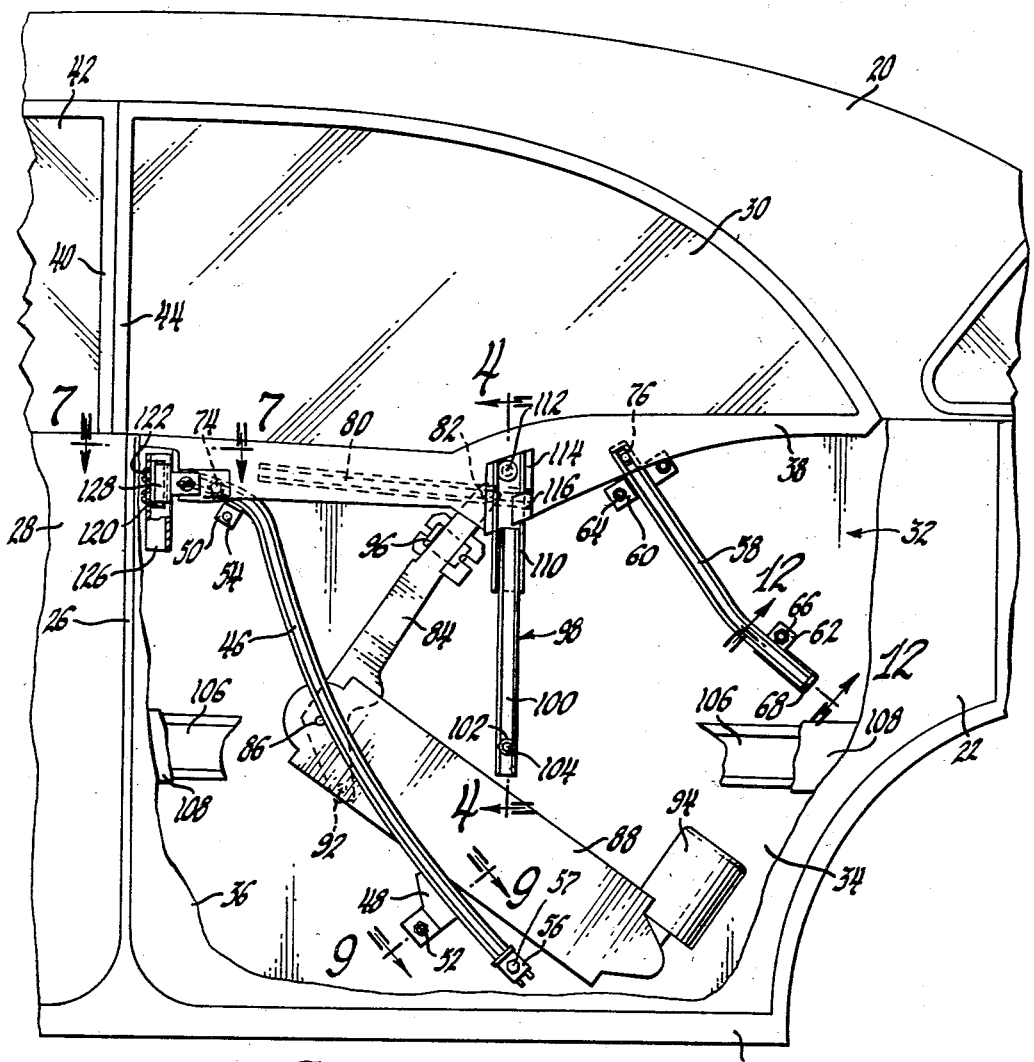

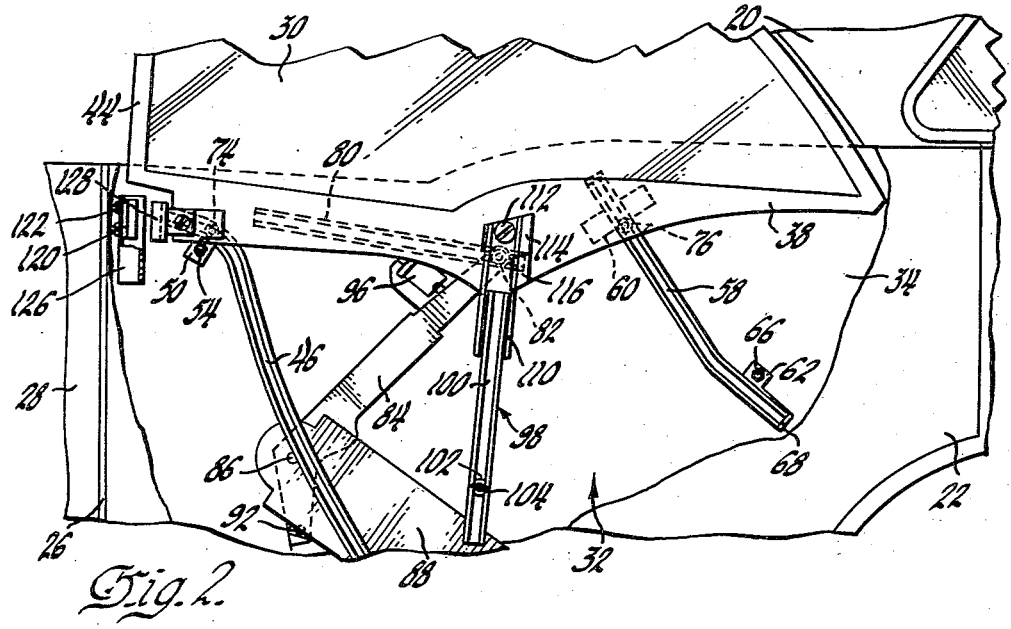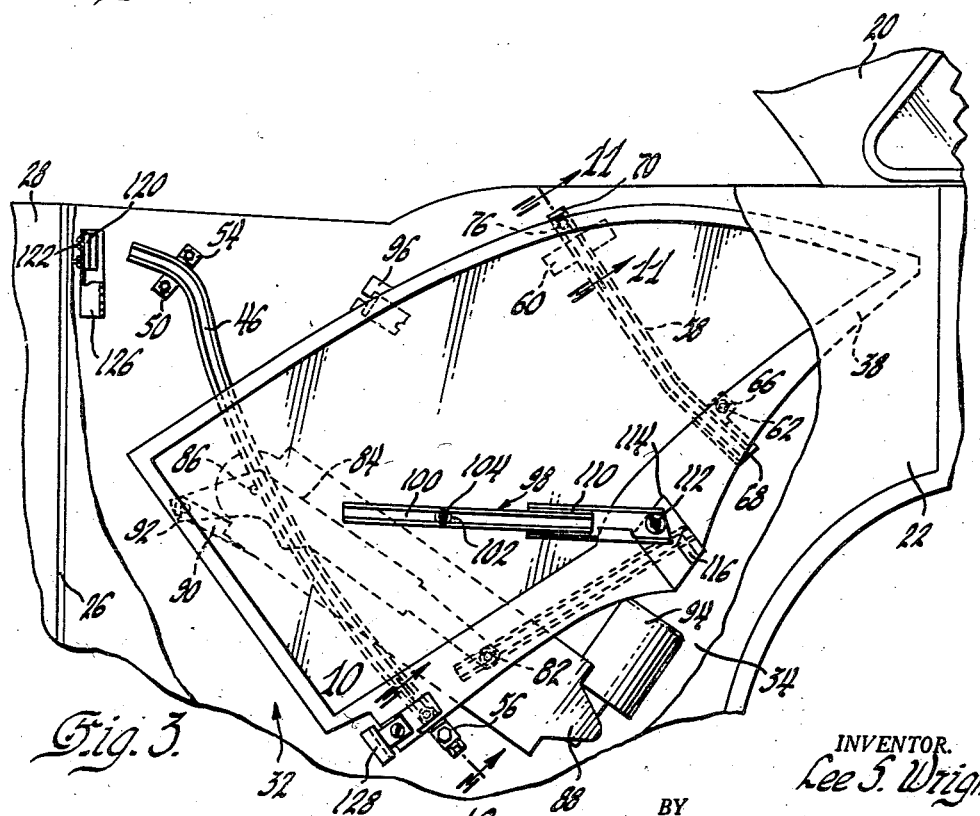

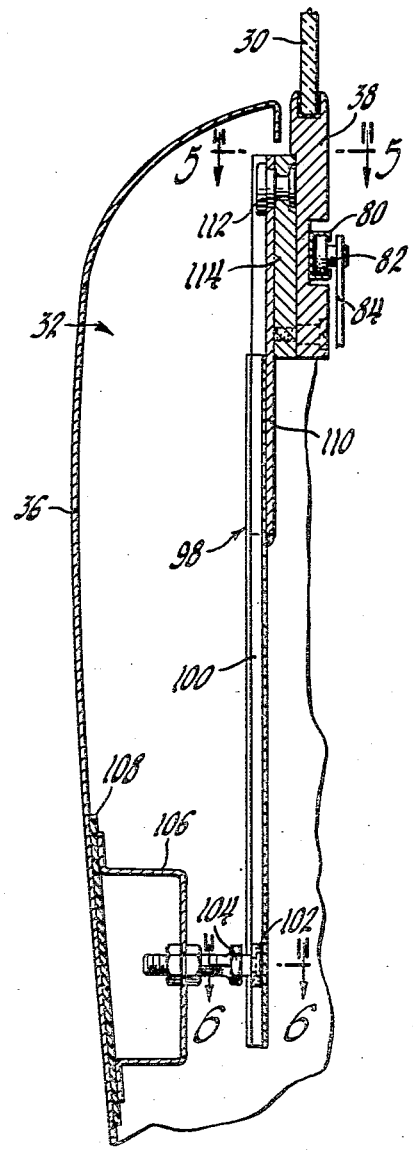
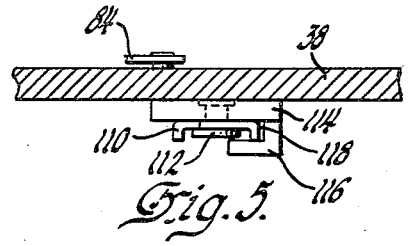
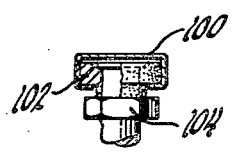
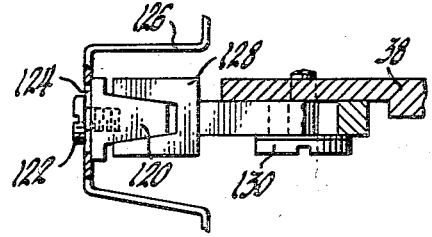
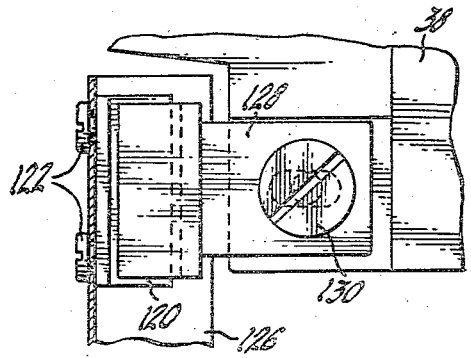

United States Patent Office 2,803,492
Patented Aug. 20, 1957

2,803,492

OPERATING APPARATUS FOR VEHICLE WINDOWS

Lee S. Wright, Royal Oak, Mich., assignor to General Motors Corporation, Detroit, Mich., a corporation of Delaware Application October 25, 1954, Serial No. 464,393

6 Claims. (Cl. 296—44)

This invention relates to vehicles and more particularly to stabilizers for vehicle windows.

A conventional sedan is provided with center pillars that extend between the floor and roof panels and with front and rear door framework that extends around the window openings. Inner and outer door panels are laterally spaced and peripherally joined to provide window wells below the window openings and the windows are supported therein and in the window openings for vertical sliding movement by vertical tracks at the front and rear edges of the windows.

The recently introduced hardtop sedan eliminates door framework (except for a forward vertical track on the front door) and center pillar structure above the belt line to provide common window openings for the front and rear windows. The front and rear windows seal against each other and against the roof panel to close the openings when in up position.

The rear window in the hardtop installation presents many problems. The window must have forward as well as vertical movement so that its front edge can overlap the adjacent door edges and the center post therebetween to seal against the rear edge of the front window (which has conventional vertical movement). The window and door are irregularly shaped because of curved belt and roof line styling. The rear wheel housing projects into the lower rear portion of the door opening to cause further door shape irregularity. As a result, minimum window stowage space is available in the window well and the window opening is so arranged thereto that the window must stow along a curvilinear path that includes plural pivot points. The limited stowage space also necessitates locating the window operating apparatus laterally of the window and confining the connections therebetween to the lower edge of the window. In addition, the absence of door framework for the window opening requires that the operating apparatus secure the window against lateral rotation while in up position.

An object of the invention is to provide a window assembly and operating apparatus suitable for installation in hardtop vehicles and the like.

Further objects and advantages of the present invention will be apparent from the following description, reference being had to the accompanying drawings, wherein a preferred form of the present invention is clearly shown.

In the drawings:

Figure 1 is a fragmentary side elevation of the rear quarter portion of a hardtop sedan, the window being closed with the rear door outer panel partially broken away;

Figure 2 is a view similar to Figure 1, the window being partially lowered;

Figure 3 is a view similar to Figure 1, the window being fully lowered;

Figure 4 is an enlarged section taken substantially along the plane indicated by the line 4—4 of Figure 1;

Figure 5 is a section taken substantially along the plane indicated by the line 5—5 of Figure 4;

Figure 6 is an enlarged section taken substantially along the plane indicated by the line 6—6 of Figure 4;

Figure 7 is an enlarged section taken substantially along the plane indicated by the line 7—7 of Figure 1;

Figure 8 is an enlarged detail of Figure 1;

Figure 9:
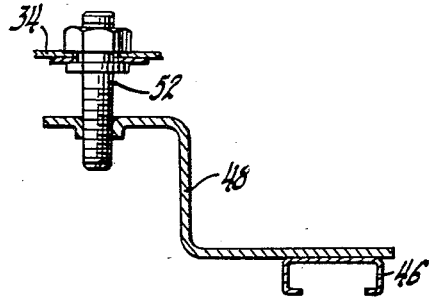
Figure 9 is an enlarged section taken substantially along the plane indicated by the line 9—9 of Figure 1.

Referring to the drawings, the rear quarter portion of the hardtop sedan comprises a roof panel 20 which slopes downwardly and rearwardly to form the rear deck of the vehicle, and a rear door 22 supported in the door frame 24 along its front edge by suitably concealed hinges and latched thereto along its rear edge by a suitably concealed lock. The lower rear portions of the door and frame are curved as shown to provide space for the rear wheel housing. The center post portion 26 of the door frame also serves to latch the rear edge of the front door 28. A generally triangular rear window 30 is mounted in the window well 32 formed by the walls of the door which includes laterally spaced inner and outer door panels 34 and 36 that are joined together at their front, rear and bottom edges. A peripheral reinforcing frame 38 carries the glass portion of the window 30 and, when the window is closed, seals against the roof panel 20 at top and rear and against the rear edge 40 of the front window 42. The front edge 44 of the rear window overlaps the rear edge of the front door 28 and the top of the center post 26 to seal against the front window 42 which is guided for vertical movement.

From a consideration of the foregoing it can be seen that lowering of the front and rear windows 42 and 30 results in window openings that extend uninterrupted above the belt line of the passenger compartment accounting for the appellation of "hardtop" to the sedan. It can also be seen that the entire support for the window 30 must be located within the window well 32 and secured to the lower edge of the window frame 38 to provide window stowage and to permit door operation with the window in up position.

Figure 10:
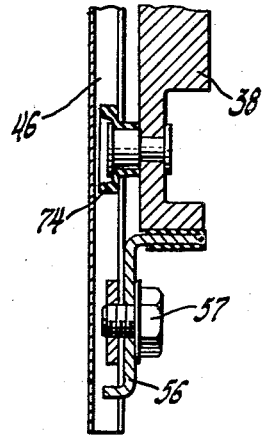
Figure 10 is an enlarged section taken substantially along the plane indicated by the line 10—10 of Figure 3.
Figure 11:
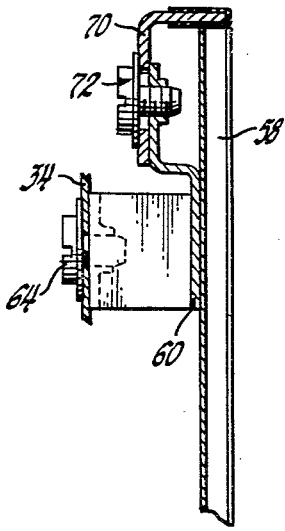
Figure 11 is an enlarged section taken substantially along the plane indicated by the line 11—11 of Figure 3.
Figure 12:
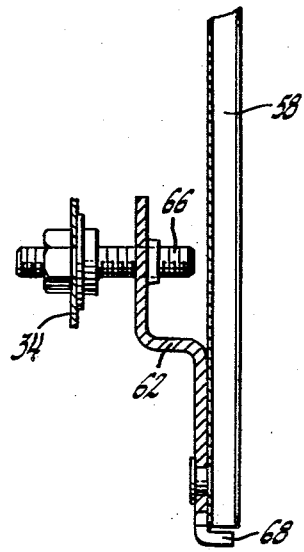
Figure 12 is an enlarged section taken substantially along the plane indicated by the line 12—12 of Figure 1.

In order to move the window from the up position of Figure 1 to the down position of Figure 3 over an irregular curvilinear path (hereafter meaning a curvilinear path with plural pivot points) that will permit stowage in the limited space that is available in the window well, curved guide means are provided that include a curved front guide track 46 mounted on the inner door panel 34 by mounting brackets 48 and 50 and studs 52 and 54 (see Figure 9). A stop bracket 56 is secured by a bolt 57 to the lower end of the track 46 to provide a front stop for the lower edge of the window in down position (see Figure 10). A curved rear guide track 58 is secured to the inner door panel 34 by mounting brackets 60 and 62 and studs 64 and 66 (see Figures 11 and 12). A lip 68 on the bracket 62 provides a rear stop for the lower edge of the window when in down position while a stop bracket 70 secured to bracket 60 by bolt 72 provides a rear stop for the lower edge of the window when in up position. The window movably connects to the front and rear tracks by front and rear rollers 74 and 76 that project (see Figure 10) from the inner side of the lower edge of the window frame into the tracks for sliding engagement therein.

In order to move the window along the guide tracks, a generally horizontal U-shaped channel 80 is secured to the window intermediate the rollers 74 and 76 (see Figure 4) to slidably receive a roller 82 that projects from one end of an operating arm 84 pivoted at 86 to a frame 88 that is secured to the inner door panel 34. A link 90 (see Figure 3) is pivotally connected at 92 to the other end of the operating arm 84. A reversible electrical motor 94 imparts generally reciprocatory movement to the link 90 through a suitable drive (not shown) to oscillate the operating arm 84 about the pivot 86 over the range shown in Figures 1 to 3. A bracket 96, secured to the inner door panel 34, provides a stop for the operating arm 84 in up position.

The operating apparatus thus far described is substantially the same as that disclosed and claimed in Serial Number 392,144, filed November 16, 1953, now Patent No. 2,775,479, Operating Apparatus for a Vehicle Window. The operating apparatus in the aforesaid application was utilized in conjunction with the rear quarter window of a hardtop coupe and the window seated in a U-shaped channel along the roof panel when in the closed position so that lateral sway of the window did not occur. As previously noted, the entire support for the window in a hardtop sedan must be contained within the window well in order that the door may open with the window in up position. The sole support of the window, as thus far described, comes from the rollers 74, 76 and 82 which lie in a substantially straight line at the lower edge of the window to utilize the limited stowage space to the utmost. This situation results in lateral instability as the straight line arrangement of the rollers is, in effect, an axis that invites lateral rotation of the window.

The invention comprises a stabilizer that cures the aforenoted lateral instability by movably and rigidly connecting the lower edge of the window to the door at a point well within the window well. Referring to the drawings and especially to Figures 4 to 8 for details, the stabilizer comprises an arm 98 that includes a U-shaped channel 100 having inwardly flanged edges to slidably receive a headed roller 102 that is carried by a bolt 104 that is adjustably secured to a channel 106 that extends horizontally along the outer door panel 36. The channel 106 is secured at its ends to the door edges and a rubber pad 108 interposed between the door outer panel and channel prevents rattle. A U-shaped channel 110 is welded to the channel 100 to form the other end of the stabilizer arm and is pivoted by a rivet 112 to a vertical plate 114 suitably fixed to the outer side of the lower edge of the window frame 38. The vertical plate 114 carries a projecting lug 116 spaced between the rivet 112 and headed roller 102 and grooved at 118 to receive the stabilizer arm channel 110.

The stabilizing arm 98 thus forms a depending arm from the lower edge of the window frame that connects to the door at a point (roller 102) well within the window well and well below the rollers 74 and 76 and the pivot 112 to provide leverage against lateral rotation. The lug 116, being spaced below the rivet 112, causes a rigid interlock to be had between the stabilizer arm and window frame when the window is in up position where lateral instability is most objectionable.

The operation of the window is best understood by reference to Figures 1 to 3. The operating arm 84 rotates clockwise and applies downward force on the channel 80 thereby moving the window rearwardly and downwardly along the irregular curvilinear front and rear tracks 46 and 58. During this movement, the stabilizing arm rotates in counterclockwise direction about the rivet 112, disengages the grooved lug 116 and slidably pivots about the roller 102 thus following an irregular curvilinear path different from that of the window.

By reference to the figures and especially to Figure 3, it will be seen that the operating apparatus is arranged in the window well with the driving linkage and curved guide tracks to one side and the stabilizer to the other to enable the window to stow between them in down position thereby utilizing the restricted window well stowage space to the utmost.

Additional lateral stability of the window in up position is achieved by a tongue and groove interlock between the window frame and door at the forward edge of the window. This interlock includes a tongue 120 that is adjustably secured for lateral movement (see Figures 7 and 8) by screws 122 in slots 124 of a transverse channel 126 that connects the front edges of the inner and outer door panels 34 and 36. A grooved bracket 128 is adjustably secured for horizontal movement by a bolt 130 to the forward edge of the window frame 38 for forward interlock with the tongue 120 on closure of the window.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. A window assembly comprising a window well, a window, means within the well connecting the well and window for movement of the window into and out of the well along an irregular curvilinear path, a stabilizer arm extending well within the well movable along an irregular curvilinear path different from that of the window for preventing lateral sway of the window and having a pivot connection with the window at one end and a slidable pivot connection with the well at the other end, and a tongue and groove connection between the window and stabilizer arm engageable on movement of the window out of the well.

2. A window assembly comprising a window well, a window including a reinforced edge, actuating and guide means within the well connecting the well and edge for movement of the window into and out of the well, a stabilizer arm extending well within the well having a pivot connection at one end with the edge and a slidable pivot connection at the other end with the well for preventing lateral sway of the window, and a tongue and groove connection between the arm and edge engageable on movement of the window out of the well.

3. A window assembly comprising a window well, a window including a reinforced edge, actuating and guide means within the well connecting the well and edge for movement of the window into and out of the well along a curvilinear path, a stabilizer arm extending well within the well having a pivot connection at one end with the edge and a slidable pivot connection at the other end with the well movable along a curvilinear path different than that of the window for preventing lateral sway of the window, and a tongue and groove connection between the arm and edge engageable on movement of the window out of the well.

4. A window assembly comprising a window well, a window including a reinforced lower edge; an actuating arm within the well having a pivot connection with the well and a slidable pivot connection with the edge for shifting the window into and out of the well; a pair of spaced guide means within the well each having a slidable pivot connection with the edge for guiding the window into and out of the well along a curvilinear path; a stabilizer arm within the well between the guide means and having a pivot connection at one end with the edge and a slidable pivot connection at the other end with the well at a point well within the well and movable along a curvilinear path different than that of the window for preventing lateral sway of the window; the actuating guide, and stabilizing means being located to the sides of the window to permit stowage of the window in the well.

5. A window assembly comprising a window well; a window including a reinforced lower edge; actuating and guide means within the well connecting the well and reinforced edge for movement of the window into and out of the well along an irregular curvilinear path; and means for preventing lateral sway of the window comprising a stabilizer arm within the well movable along an irregular curvilinear path different from that of the window and having a pivot connection at one end with the reinforced edge, a slidable pivot connection at the other end with the well at a point well within the well, and a tongue and groove connection with the reinforced edge at a point between the pivot connections and engageable on movement of the window out of the well for preventing lateral sway of the window; the actuating, guide, and stabilizing means being located to the sides of the window to permit stowage of the window in the well.

6. A window assembly comprising a window well, a window including a reinforced lower edge, spaced first and second guide means within the well connecting the well and edge for movement of the window into and out of the well along an irregular curvilinear path, actuating means secured within the well operatively connected to the edge, and a swingable stabilizer arm within the well spaced from the guide means, the stabilizer arm having a pivot connection with the edge and a spaced pivot connection with the well at a point well within the well to prevent lateral sway of the window about the guide means and including means to permit relative advance and retreat of the pivot connections on movement of the window into and out of the well.

References Cited in the file of this patent

UNITED STATES PATENTS

| | | |
|---|---|---|
| 2,590,448 | Orr | Mar. 25, 1952 |
| 2,745,662 | McDougall | May 15, 1956 |

FOREIGN PATENTS

| | | |
|---|---|---|
| 444,279 | Great Britain | Mar. 18, 1936 |
| 466,145 | Great Britain | May 24, 1937 |